Patented Nov. 22, 1932

1,888,453

UNITED STATES PATENT OFFICE

FERDINAND DE PAPE, OF UCCLE, BELGIUM, ASSIGNOR TO LA SOUDURE ELECTRIQUE AUTOGÈNE S. A., OF BRUSSELS, BELGIUM

SALINE COATINGS AND PROCESS OF MAKING THE SAME

No Drawing. Application filed November 12, 1928, Serial No. 319,023, and in France June 26, 1928.

This invention relates to a process of making saline compositions suitable for use as a welding flux and intended to form the flux coatings of welding rods and of electrodes used for welding non-ferrous metals by the electric arc.

In the metallurgy of metals other than iron and in particular in the metallurgy and the welding operations carried out by means of the gas blow pipe, of the light metals such as aluminium, it is known to use essentially water soluble saline compounds as a flux, i. e. water soluble halogenate compounds of alkaline metals or alkaline earth-metals and other metallic salts soluble in water. Powdered saline materials are also known for welding copper and its alloys.

For various chemical and physico-chemical reasons (for instance, the destructive action of salts on organic binders, the difference in the solubility coefficients of the salts, respectively, and the coagulating action of water soluble salts in general on known inorganic binders such as alkaline silicate solutions), it was not possible to supply suitable saline mixtures in a colloidal, plastic or viscous form enabling a paste or coating to be obtained which was capable of being applied to, and of drying on, the parts to be welded (in the case of butt welding) or on weld sticks and electrodes used in arc welding.

The present invention provides a new practical method of making saline welding composition comprising water soluble compounds, and capable of being applied as a paste to form by desiccation, a dry and adherent coating for instance by application on welding rods or soldering sticks or metallic electrodes used in arc welding.

The invention comprises a process in which the silica of a solution of an alkali metal silicate is dispersed with water soluble compounds which enter into the flux forming composition and which at the same time combine chemically with the alkali of said alkali metal silicate solution.

In other words and in a broader form of execution of the invention, water soluble compounds (salts) which enter into the flux forming coating, are added to and ground with a solution of an alkali metal silicate, and in the resulting mixture in which the silicate is separated from the alkali of said solution, a water soluble compound is added, which chemically combines the alkali and at the same time disperses physically said gelatinous silica.

From the collodial chemistry point of view, the degree of dispersion of the gel of silica is what is called the "true dispersion" and cannot be confounded with the degree of dispersion of a colloidal solution or "sol". This particular step of the process, which leads to said true dispersion of the gelatinous silica and which at the same time neutralizes the freed alkali, in the presence of water soluble salts, will hereinafter be called the "acid peptization" or for short "peptization" step.

From a physical point of view, the compositions according to the invention are essentially composed of a mixture of water soluble salts, partly in suspension and partly in solution, the said salts forming with dispersed silica a particular colloidal system, that is to say a viscous and fluid paste of saline particles which is capable of drying and agglutinating on a metallic support, to which they then solidly adhere.

Other details of the process according to the invention are to be found in the examples given below.

Example 1

A paste for coating aluminium welding rods is prepared as follows:

A mixture of alkaline chlorides which enter into the composition of said coating and which comprises 70 to 90 parts in weight of sodium chloride and 10 to 30 parts in weight of lithium chloride are ground with 100 to 130 parts in volume of a potassium silicate solution (specific gravity 20-28° Bé. and molecular ratio $SiO_2 : K_2O$ of about 4.0).

After grinding this mixture, 25 to 40 parts of fluorhydric acid (HF) at a concentration of 40% are slowly added, while stirring to the decomposition mixture in which the alkali of the silicate is separated from the silica through coagulation (formation of a gel) of said silica.

In this last step which can be termed peptization, the silica gel is dispersed and the alkali ($K_2O$) is combined to give potassium fluoride, whereby the paste or saline coating according to the invention is obtained.

In the above described example the acid dispersion or peptization agent (HF) which combines the alkali can be replaced by an equivalent acid salt for example potassium-hydrogen fluoride (KF.HF) which is a more handy form of fluorhydric acid, and which can advantageously increase, if desired, the percentage of fluoride in the composition.

The combination of the alkali with the agent of dispersion, with the formation of a salt in situ cannot be considered as a direct neutralization as considered in elementary chemistry because adsorption phenomena inherent to the particular colloidal system obtained in this process are able to keep an acid and a base present without their reacting immediately upon each other to effect mutual neutralization.

To obtain a final product, substantially neutral, or even slightly acid, the acid peptization step can nevertheless be controlled, by controlling the pH value of the paste by a known method.

*Example 2*

350 cc. of sodium silicate (specific gravity 40° Bé. and molecular ratio $SiO_2:Na_2O$ of about 3.4) diluted with 350 cc. of water are decomposed in a mortar with 100 gr. of potassium fluoride. After grinding and allowing to stand for about half an hour the alkaline decomposition mixture is peptized by slowly adding, with stirring, 120–140 cc. of phosphoric acid (specific gravity 1.3).

The coating thus prepared may be rendered more fluid by addition of water. Furthermore, it has been found that when the peptization has been suitably effected, the colloidal system is sufficiently stable to allow of incorporating therein one or more other crystalloids (water soluble salts) in aqueous solution. Moreover, after peptization, it is possible, according to the invention, to incorporate in the colloidal system formed, one or more crystalloidal salts, soluble or slightly soluble in water, in the solid state, by grinding. According to this particular feature of the invention, it is possible, for example, to incorporate in the coating, easily-decomposable salts, without decomposing them and whose properties it is desired to preserve in the dried paste of coating.

*Example 3*

100 gr. of sodium and potassium carbonate and 100 gr. of sodium hypophosphite are incorporated by grinding in the peptized mixture obtained according to Example 2. After the salts have been absorbed in the colloidal system, and for the purpose already described 50–100 gr. of an inert substance are added, together with the requisite quantity of water to form a suitably fluid paste. The mixture can be used to coat or cover rods or wires of copper or copper alloys.

Modifications in the methods of carrying out the invention are possible. Thus, for example, in producing a coating composition according to the specific Example 1, the fluorhydric acid disperses the silica and combines the alkali, forming a fluoride, while in the Example 2 the dispersion of the silica and combination of the alkali is effected by phosphoric acid.

In this second example, however, according to the proportions of the compounds used, the added phosphoric acid may eventually decompose a fraction of the fluoride of potassium, forming a phosphate and liberating a corresponding quantity of fluorhydric acid which in this case cooperates also in the acid peptization process.

Thus, in a form of carrying out the process according to the Example 2, the decomposition step can for instance be started with a phosphate and/or phosphoric acid, the acid peptization being effected with a flouride or di-fluoride.

It is also possible to add to the achieved composition or in the course of production thereof, known adjuvants, for example, oxides, alkaline-earth or insoluble metallic carbonates, combustible substances such as carbon, or metallic substances or the like which do not interfere chemically in the peptization step, but are intended, for example, to increase the refractory properties of the coating, to determine its melting point or to cause different effects in the arc or in the formation of the welding slag.

Welding electrodes or rods which have been coated with the paste compositions are preferably dried in air at temperatures of about 80–100° C.

The flux coating obtained according to the invention, for instance, those prepared as in Examples 1 or 2, may also be used on the articles which are to be welded (e. g. by butt-welding) or soldered.

What I claim is:

1. A method of making welding compositions in the form of a paste containing water soluble compounds, to form a dry coating for welding rods and electrodes used for arc welding, comprising dispersing the silica of an alkali metal silicate solution with water soluble compounds which enter into the flux forming composition and which at the same time chemically combine the alkali of said alkali metal silicate solution.

2. A method of making welding compositions in the form of a paste containing water soluble compounds to form a dry coating for welding rods and electrodes used for arc welding, comprising the step of grinding together an alkali metal silicate solution with water soluble salts which enter in the flux coating, and the step of adding to the resulting mixture, in which the silica is separated from the alkali of said solution, a compound of acid character which chemically combines the free alkali of said silicate solution, forming in situ a salt entering also in the composition, and at the same time disperses the said silica.

3. In a method of the character described in claim 2, the addition of salts in aqueous solution to the resulting composition.

4. In a method of the character described in claim 2, the addition of water soluble salts in solid form to the resulting composition.

5. In a method of the character described in claim 2, the addition to the resulting composition of refractory insoluble compounds which remain chemically inert in the formation of the composition and modify the properties of said composition.

In testimony whereof I affix my signature.

FERDINAND de PAPE.